(12) United States Patent
Carpenter

(10) Patent No.: US 9,949,469 B1
(45) Date of Patent: Apr. 24, 2018

(54) LINE REEL APPARATUS

(71) Applicant: William J. Carpenter, Mansfield, LA (US)

(72) Inventor: William J. Carpenter, Mansfield, LA (US)

( * ) Notice: Subject to any disclaimer, the term of this patent is extended or adjusted under 35 U.S.C. 154(b) by 412 days.

(21) Appl. No.: 14/882,567

(22) Filed: Oct. 14, 2015

(51) Int. Cl.
*A01K 89/01* (2006.01)
*A01K 89/027* (2006.01)

(52) U.S. Cl.
CPC .... *A01K 89/01085* (2015.05); *A01K 89/0102* (2013.01); *A01K 89/0117* (2013.01); *A01K 89/0275* (2013.01)

(58) Field of Classification Search
CPC .............. A01K 89/01; A01K 89/01029; A01K 89/0108; A01K 89/01085; A01K 89/01086; A01K 89/0275; A01K 89/028
See application file for complete search history.

(56) References Cited

U.S. PATENT DOCUMENTS

| | | | |
|---|---|---|---|
| 28,286 A | 5/1860 | Ledy et al. |
| 2,862,679 A | 12/1958 | Denison et al. |
| 3,097,813 A | 7/1963 | Golec |
| 3,223,347 A | 12/1965 | Clark |
| 3,351,300 A | 11/1967 | Nagy |
| 3,498,562 A | 3/1970 | Johnson |
| 4,156,510 A | 5/1979 | Hull |
| 4,386,743 A | 6/1983 | Moss |
| 4,509,704 A | 4/1985 | Ozaki et al. |
| 4,756,487 A | 7/1988 | Hayashi |
| 5,393,006 A | 2/1995 | Miyazaki et al. |
| 5,503,346 A | 4/1996 | Miyazaki et al. |
| 6,375,107 B1 | 4/2002 | Wong |
| 6,634,350 B2 | 10/2003 | LaSee |
| 9,043,999 B1 | 6/2015 | Boester |
| 2014/0332615 A1 | 11/2014 | Braun et al. |

*Primary Examiner* — Emmanuel M Marcelo
(74) *Attorney, Agent, or Firm* — R. Keith Harrison

(57) ABSTRACT

A line reel apparatus includes an apparatus housing having a fixed housing portion and a rotating housing portion adjacent to the fixed housing portion. A pin magnet is provided on the rotating housing portion. A drive mechanism drivingly engages the rotating housing portion for rotation. A catch pin housing is disposed for rotation in the rotating housing portion. A line annulus is formed between the catch pin housing and the rotating housing portion. A catch pin cavity is provided in the catch pin housing. The catch pin cavity is disposed in aligned or registering relationship to the pin magnet along a longitudinal axis of the rotating housing portion. A magnetic catch pin is disposed in the catch pin cavity and positional between a retracted position clearing the line annulus and an extended position spanning the line annulus upon alignment of the pin magnet with the catch pin cavity responsive to rotation of the rotating housing portion. A bias mechanism biases the catch pin in the retracted position in the catch pin cavity. A spool is provided in the rotating housing portion and a line is wound on the spool and extends through the line annulus from the rotating housing portion.

20 Claims, 6 Drawing Sheets

LINE REEL APPARATUS

FIELD

Illustrative embodiments of the disclosure generally relate to reels for reeling a line such as a fishing line on a fishing rod or fishing bow. More particularly, illustrative embodiments of the disclosure relate to a line reel apparatus which deploys a magnet-actuated rotating catch pin to catch and wind a line on a rotating spool.

SUMMARY

Illustrative embodiments of the disclosure are generally directed to a line reel apparatus which deploys a magnet-actuated rotating catch pin to catch and wind a line on a rotating spool in bow fishing, reel fishing or other applications. An illustrative embodiment of the line reel apparatus includes an apparatus housing including a fixed housing portion and a rotating housing portion adjacent to the fixed housing portion; a pin magnet carried by the rotating housing portion; a drive mechanism drivingly engaging the rotating housing portion for rotation; a catch pin housing disposed for rotation in the rotating housing portion; a line annulus between the catch pin housing and the rotating housing portion; a catch pin cavity in the catch pin housing, the catch pin cavity disposed in aligned or registering relationship to the pin magnet along a longitudinal axis of the rotating housing portion; a magnetic catch pin disposed in the catch pin cavity, the catch pin positional between a retracted position clearing the line annulus and an extended position spanning the line annulus upon alignment of the pin magnet with the catch pin cavity responsive to rotation of the rotating housing portion; a bias mechanism biasing the catch pin in the retracted position in the catch pin cavity; and a spool provided in the rotating housing portion.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figures 1, 2:
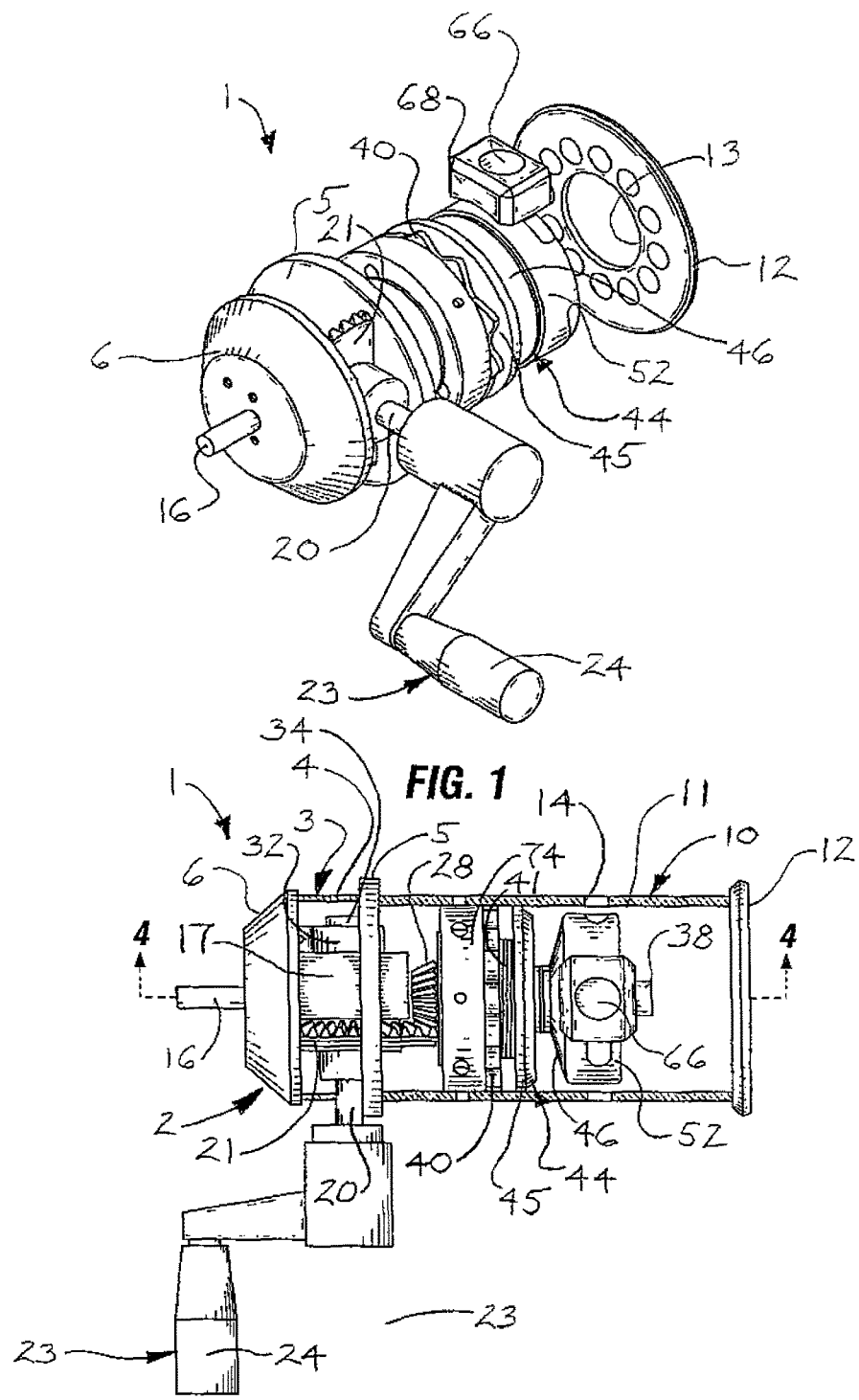
FIG. 1 is a rear perspective view of an illustrative embodiment of the line reel apparatus, with an apparatus housing removed from the apparatus for clarity.
FIG. 2 is a side view of an illustrative embodiment of the line reel apparatus, with the apparatus housing illustrated in longitudinal sectional view.
Figure 3:
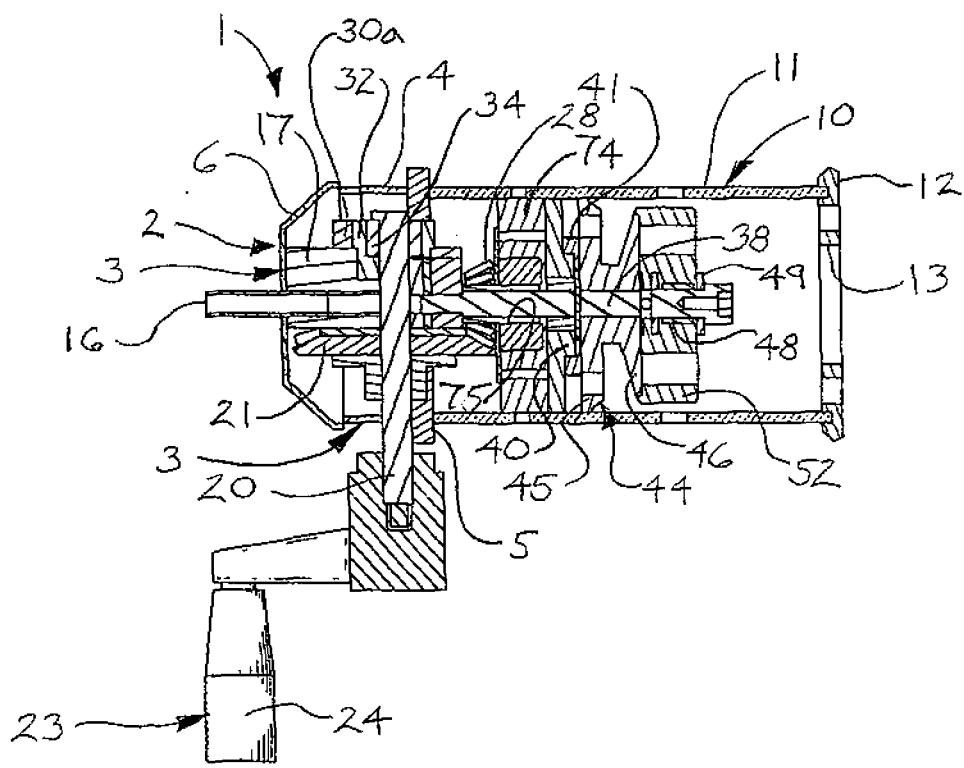
FIG. 3 is a longitudinal sectional view of the illustrative line reel apparatus.
Figure 4:
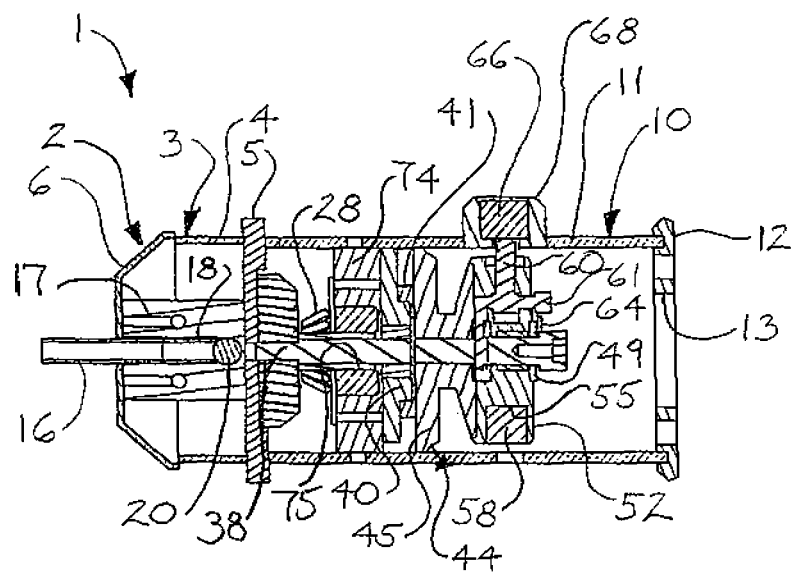
FIG. 4 is a longitudinal sectional view of the illustrative line reel apparatus, taken along section lines 4-4 in FIG. 2.

Referring to the drawings, an illustrative embodiment of the line reel apparatus, hereinafter apparatus, is generally indicated by reference numeral 1. As illustrated in FIGS. 2-4, the apparatus 1 includes an apparatus housing 2. In some embodiments, the apparatus housing 2 may be generally elongated and cylindrical, as illustrated. The apparatus housing 2 may include a fixed housing portion 3 and a rotating housing portion 10 which extends from and is rotatable with respect to the fixed housing portion 3. The fixed housing portion 3 may include a fixed housing portion wall 4 which may be generally cylindrical. A fixed housing portion front plate 5 and a fixed housing portion rear plate 6 may terminate the respective front and rear ends of the fixed housing portion wall 4.

The rotating housing portion 10 of the apparatus housing 2 may include a rotating housing portion wall 11 which may be generally cylindrical. The rotating housing portion wall 11 may be mounted for rotation relative to the fixed housing portion front plate 5 according to the knowledge of those skilled in the art. In some embodiments, the rear end of the rotating housing portion wall 11 may be mounted for rotation in an interlocking wall groove (not illustrated) which is provided in the fixed housing portion front plate 5. A rotating housing portion front plate 12 through which extends a line opening 13 may be provided on a front end of the rotating housing portion wall 11 for purposes which will be hereinafter described. As illustrated in FIG. 2, a pin slot 14 extends through the rotating housing portion wall 11 of the rotating housing portion 10 for purposes which will be hereinafter described.

A handle shaft bearing block 17 may be provided in the fixed housing portion 3. The handle shaft bearing block 17 may be mounted on a bearing block mounting stud 16 which extends through the fixed housing portion rear plate 6 into the fixed housing portion 3.

A drive mechanism 23 may include a handle shaft 20 which is mounted for rotation in the handle shaft bearing block 17 and the fixed housing portion wall 4 of the fixed housing portion 3. In some embodiments, the drive mechanism 23 may include a hand crank 24 which drivingly engages the handle shaft 20 for rotation. In other embodiments, the drive mechanism 23 may include an electric motor or other drive device. A toothed handle gear 21 may be drivingly engaged for rotation by the handle shaft 20 inside the fixed housing portion 3. The handle gear 21 may extend through a handle gear slot 8 (FIG. 5) provided in the fixed housing panel front plate 5 and protrude into the rotating housing portion 10, as illustrated in FIG. 3.

Figure 5:
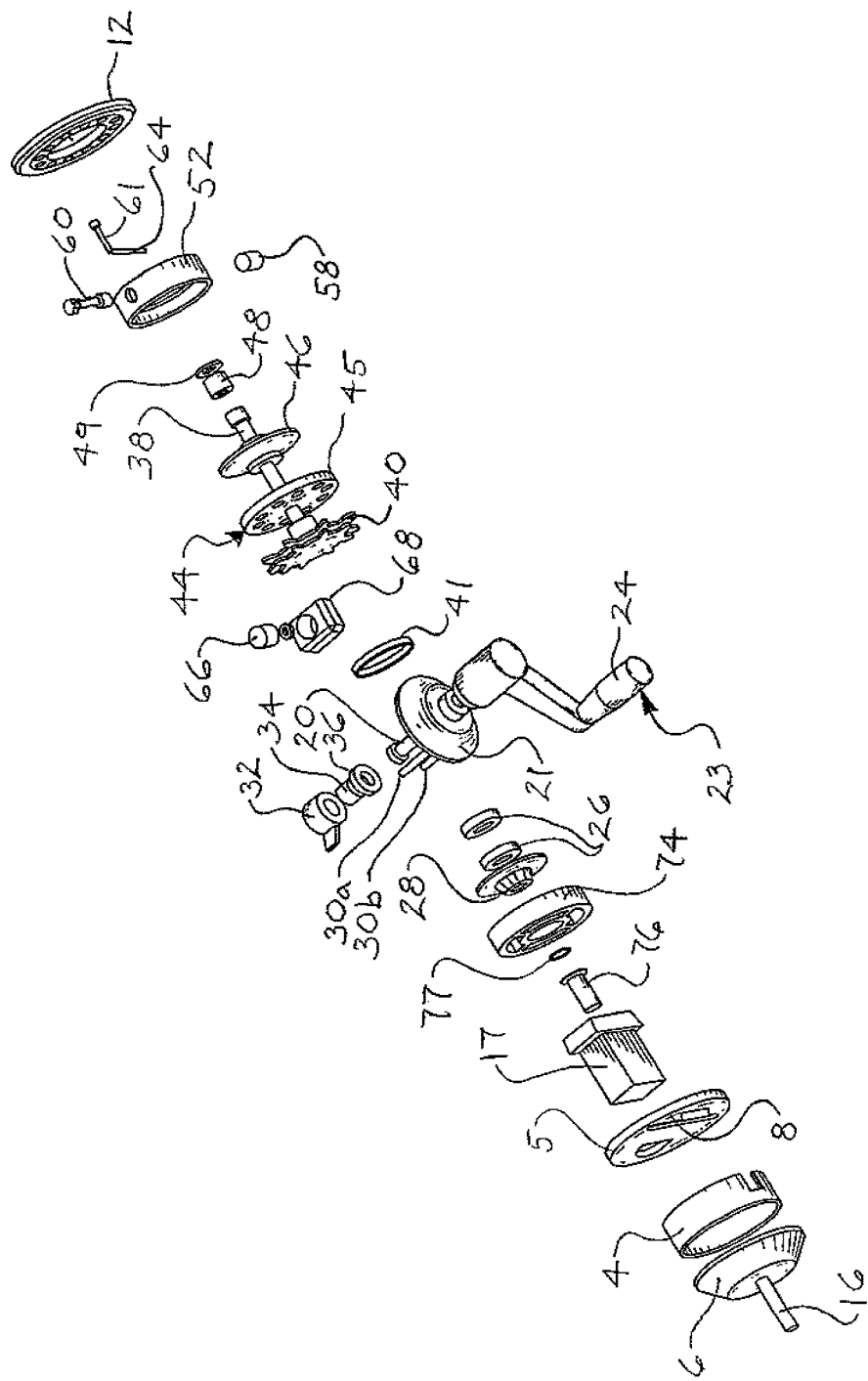
FIG. 5 is an exploded perspective view of the interior components of the illustrative line reel apparatus.

As further illustrated in FIGS. 3 and 4, a main shaft 38 may be disposed within the rotating housing portion 10 of the apparatus housing 2. The main shaft 38 may terminate inside the handle shaft bearing block 17. A bevel gear 28 and a transmission plate 74 may be mounted for rotation on the main shaft 38. As illustrated in FIG. 5, the transmission plate 74 may be mounted on a transmission plate bearing 76 secured by a shim 77. The bevel gear 28 meshes with the handle gear 21 and drivingly engages the transmission plate 74 for rotation via threaded fasteners and/or other attachment technique known by those skilled in the art. The bevel gear 28 and the transmission plate 74 may be freely rotatable with respect to the main shaft 38 typically via a pair of ball bearings 26 (FIG. 5). The transmission plate 74 drivingly engages the rotating housing portion 10 for rotation relative to the fixed housing portion 3 according to the knowledge of those skilled in the art. Accordingly, upon forward rotation of the hand crank 24, typically in the clockwise direction, the handle shaft 20 rotates the handle gear 21 which, in turn, rotates the bevel gear 28. The bevel gear 28 rotates the transmission plate 74, which rotates the rotating housing portion 10 of the apparatus housing 2, in the forward direction (typically the clockwise direction as viewed from the rear), for purposes which will be hereinafter described. Conversely, upon reverse rotation of the hand crank 24, typically in the counterclockwise direction, the handle shaft 20, handle gear 21, bevel gear 28 and transmission plate 74 rotate the rotating housing portion 10 of the apparatus housing 2 in the reverse direction (typically counterclockwise direction as viewed from the rear).

As illustrated in FIGS. 2, 3 and 5, in some embodiments, a hand crank lock needle 34 and a ball bearing 36 (FIG. 5) may be provided on the handle shaft 20 inside the fixed housing portion 3 of the apparatus housing 2. A reverse stop 32 may interface with the hand crank lock needle 34. A first travel stop pin 30a and a second travel stop pin 30b may be provided in the fixed housing portion 3 in parallel and spaced-apart relationship to each other and the handle shaft 20. Accordingly, upon forward rotation of the hand crank 24, the handle shaft 20 rotates the reverse stop 32 into engagement with the first travel stop pin 30a. The hand crank lock needle 34 may permit continued and unlimited forward rotation of the hand crank 24 and corresponding forward rotation of the rotating housing portion 10. Upon reverse rotation of the hand crank 24, the handle shaft 20 rotates the reverse stop 32 out of engagement with the first travel stop pin 30a and into engagement with the second travel stop pin 30b. The hand crank lock needle 34 prevents further reverse rotation of the hand crank 24 and corresponding reverse rotation of the housing portion 10. Thus, the second travel stop pin 30b may permit limited reverse rotation of the hand crank 24 and corresponding reverse rotation of the rotating housing portion 10.

Figure 10:
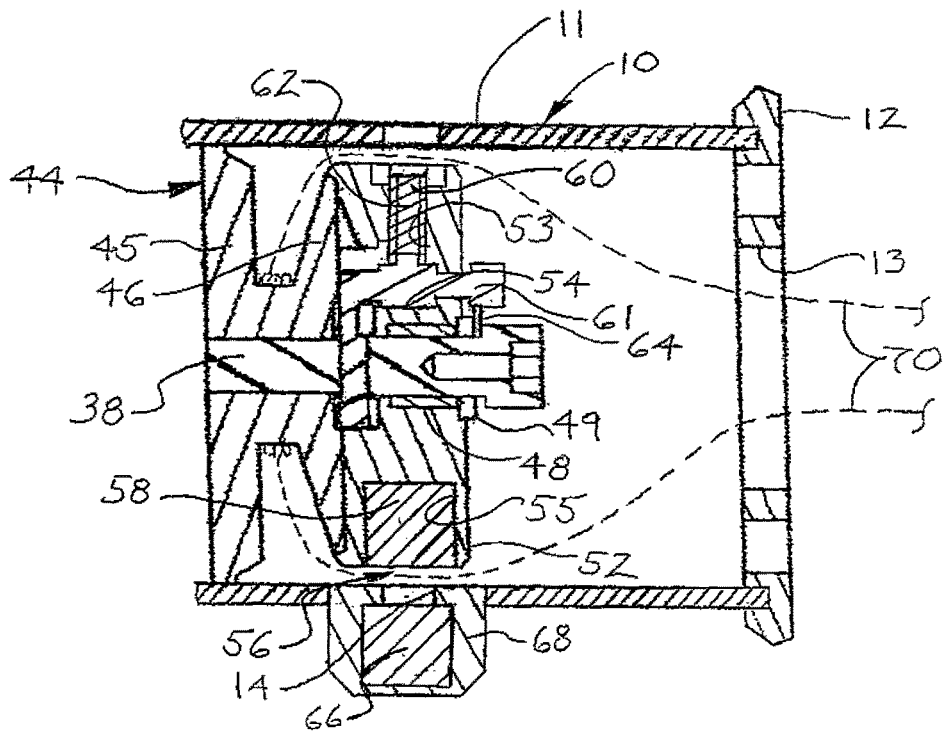
FIG. 10 is a longitudinal sectional view of a portion of the line reel apparatus, with the catch pin retracted into the catch pin housing to facilitate free rotation of the fishing line in the line annulus and unwinding of the fishing line from the spool.
Figure 11:
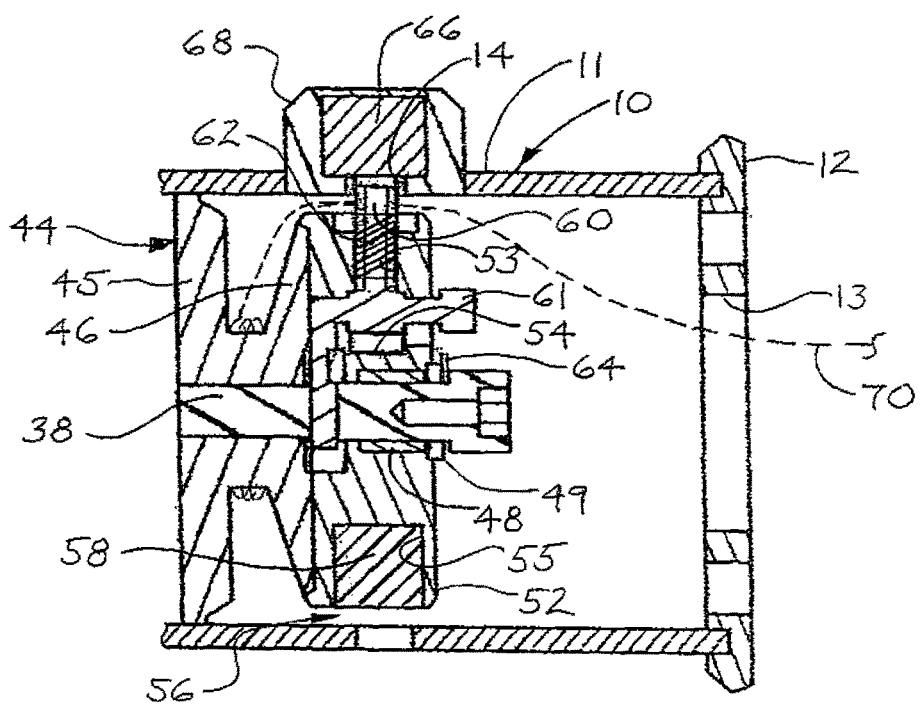
FIG. 11 is a longitudinal sectional view of a portion of the line reel apparatus, with the catch pin magnetically extended from the catch pin housing to engage the fishing line in the line annulus and winding of the fishing line on the spool.

A spool 44 is provided on the main shaft 38. In some embodiments, the spool 44 may include a rear spool portion 45 and a front spool portion 46 which complements the rear spool portion 45. As illustrated in FIGS. 10 and 11, in typical application of the apparatus 1, which will be hereinafter described, a fishing line 70 may be wound on the spool 44 for purposes which will be hereinafter described.

A drag wheel 40 may be mounted on the main shaft 38 between the transmission plate 74 and the spool 44. A friction drag wave spring 41 may be sandwiched between the drag wheel 40 and the rear spool portion 45 of the spool 44. Accordingly, responsive to a pulling force on the fishing line 70, the drag wheel 40 and the friction drag wave spring 41 may apply a drag force against the spool 44 for purposes which will be hereinafter described.

A catch pin housing 52 is provided on the main shaft 38 adjacent to the spool 44. A catch pin housing lock needle 48, secured with a flat washer 49 (FIG. 5), may facilitate rotation of the catch pin housing 52 in a forward direction and prevent rotation of the catch pin housing 52 in a reverse direction on the main shaft 38 for purposes which will be hereinafter described. A line annulus 56 is formed by and between the outer surface of the catch pin housing 52 and the inner surface of the rotating housing portion wall 11 of the rotating housing portion 10. As illustrated in FIGS. 10 and 11, a radial catch pin cavity 53 extends into the outer surface or edge toward the geometric center of the catch pin housing 52. A field breaker pin cavity 54 in the catch pin housing 52 may communicate with the catch pin cavity 53. The catch pin cavity 53 is disposed in aligned or registering relationship to the pin slot 14 along the longitudinal axis of the rotating housing portion wall 11 of the rotating housing portion 10.

As further illustrated in FIGS. 10 and 11, a catch pin 60 is disposed for axial displacement within the catch pin cavity 53 between the retracted position illustrated in FIG. 10 and the extended position illustrated in FIG. 11. A magnetic field breaker pin 61 may extend from the catch pin 60 and protrude from the field breaker pin cavity 54 beyond the surface of the catch pin housing 52, as illustrated. A bias mechanism such as a pin spring 62 is provided in the catch pin cavity 53 and normally biases the catch pin 60 in the retracted position in the catch pin cavity 53, as illustrated in FIG. 10.

Figure 6:
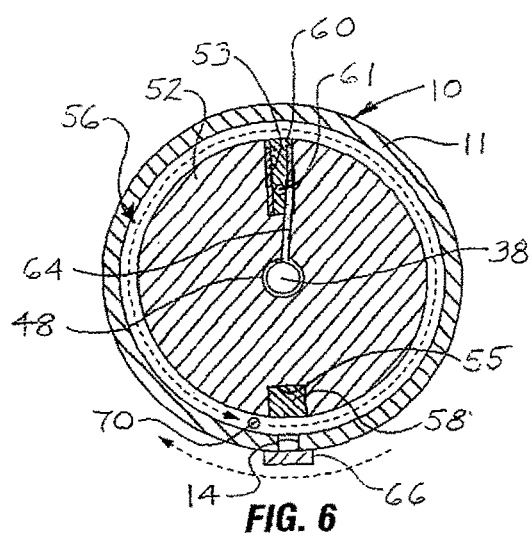
FIG. 6 is a sectional view of a rotating housing portion of the apparatus housing and a catch pin housing in the rotating housing portion, with the catch pin housing prevented from rotating upon initial rotation of the rotating housing portion as the pin magnet on the rotating housing portion approaches the catch pin retracted in the catch pin housing, more particularly illustrating free rotation of a fishing line throughout the line annulus between the catch pin housing and the rotating housing portion to facilitate unwinding of the fishing line from a spool (not illustrated)
Figure 8:
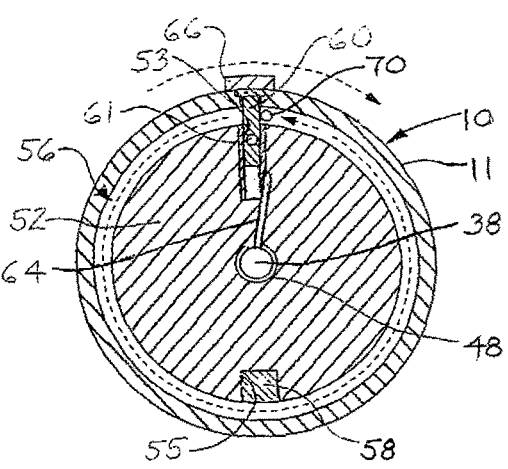
FIG. 8 is a sectional view of the rotating housing portion and the catch pin housing, with the pin magnet on the rotating housing portion rotated into registration with the catch pin in the catch pin housing, more particularly illustrating magnetic deployment of the catch pin from the catch pin housing against the pin magnet and the catch pin engaging the fishing line to prevent rotation of the fishing line in the line annulus and facilitate winding of the fishing line on the spool (not illustrated)
Figure 7:
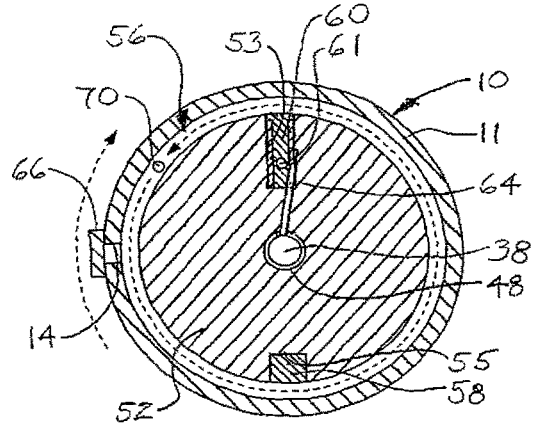
FIG. 7 is a sectional view of the rotating housing portion and the catch pin housing, with the catch pin housing still prevented from rotating upon continued rotation of the rotating housing portion as the pin magnet on the rotating housing portion approaches the catch pin retracted in the catch pin housing with free rotation of a fishing line throughout the line annulus between the catch pin housing and the rotating housing portion.
Figure 9:
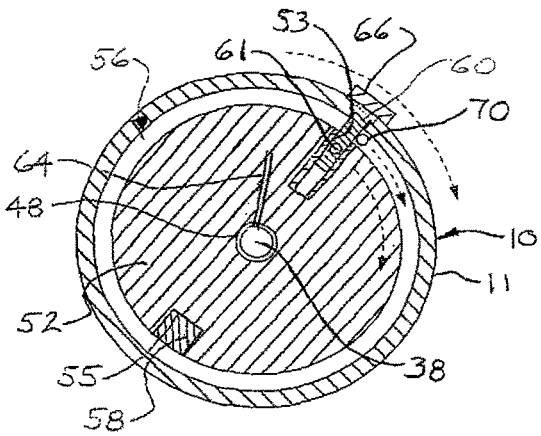
FIG. 9 is a sectional view of the rotating housing portion and the catch pin housing, with rotation of the rotating housing portion transmitted to the catch pin housing to continue winding the fishing line on the spool.

A pin magnet 66 is provided on the exterior surface of the rotating housing portion wall 11 of the rotating housing portion 10 and overlies the pin slot 14. As illustrated in FIGS. 10 and 11, in some embodiments, the pin magnet 66 may be seated in a magnet retainer 68 provided on the rotating housing portion wall 11. As was heretofore described with respect to FIGS. 1-4, forward rotation of the hand crank 24 facilitates forward rotation of the rotating housing portion 10 of the apparatus housing 2 through the handle shaft 20, the handle gear 21, the bevel gear 28 and the transmission plate 74, respectively. When the rotating housing portion 10 is positioned with respect to the catch pin housing 52 such that the pin magnet 66 does not align or register with the catch pin 60 in the catch pin cavity 53 of the catch pin housing 52, as illustrated in FIGS. 6, 7 and 10, the pin spring 62 biases the catch pin 60 in the retracted position in the catch pin cavity 53. When the rotating housing portion 10 rotates the pin magnet 66 into alignment or registration with the catch pin 60, the pin magnet 66 magnetically attracts the catch pin 60 such that the catch pin 60 extends from the catch pin cavity 53 against the retracting bias imparted by the pin spring 62. Accordingly, as illustrated in FIGS. 8 and 11, the extended catch pin 60 inserts through the pin slot 14 in the rotating housing portion wall 11 and engages the pin magnet 66, spanning the line annulus 56 between the catch pin housing 52 and the rotating housing portion wall 11 and drivingly engaging the catch pin housing 52 with the rotating housing portion 10 for rotation. As illustrated in FIG. 9, continued forward rotation of the rotating housing portion 10 via the hand crank 24 facilitates forward rotation of the catch pin housing 52 with the rotating housing portion 10.

A retainer magnet cavity 55 may be provided in the outer surface or edge of the catch pin housing 52, typically in generally 180-degree spaced-apart relationship to the catch pin cavity 53. A housing retainer magnet 58 may be provided in the retainer magnet cavity 55. Accordingly, when the rotating housing portion 10 is in a stationary housing position in which the pin magnet 66 is about 180 degrees from the catch pin 60, as illustrated in FIGS. 6 and 10, the housing retainer magnet 58 may magnetically attract the pin magnet 66 to prevent inadvertent rotation of the rotating housing portion 10 relative to the catch pin housing 52 and normally maintain the rotating housing portion 10 in the stationary housing position for purposes which will be hereinafter described.

In some embodiments, a retainer pin 64 may extend outwardly from the main shaft 38. When the catch pin 60 is in the retracted position in the catch pin cavity 53, as illustrated in FIGS. 6, 7 and 10, the magnetic field breaker pin 61 may engage the retainer pin 64 to prevent inadvertent rotation of the catch pin housing 52 as the rotating housing portion 10 rotates the pin magnet 66 from the stationary housing position illustrated in FIG. 6 into alignment or registration with the catch pin 60, as illustrated in FIG. 8. Upon alignment or registration of the pin magnet 66 with the catch pin 60, the catch pin 60 extends from the catch pin cavity 53 and engages the pin magnet 66, as illustrated in FIGS. 8, 9 and 11. Simultaneously, the field breaker pin 61 slides with the catch pin 60 and disengages the retainer pin 64 to facilitate rotation of the catch pin housing 52 with the rotating housing portion 10 via the catch pin 60, for purposes which will be hereinafter described.

Figure 12:
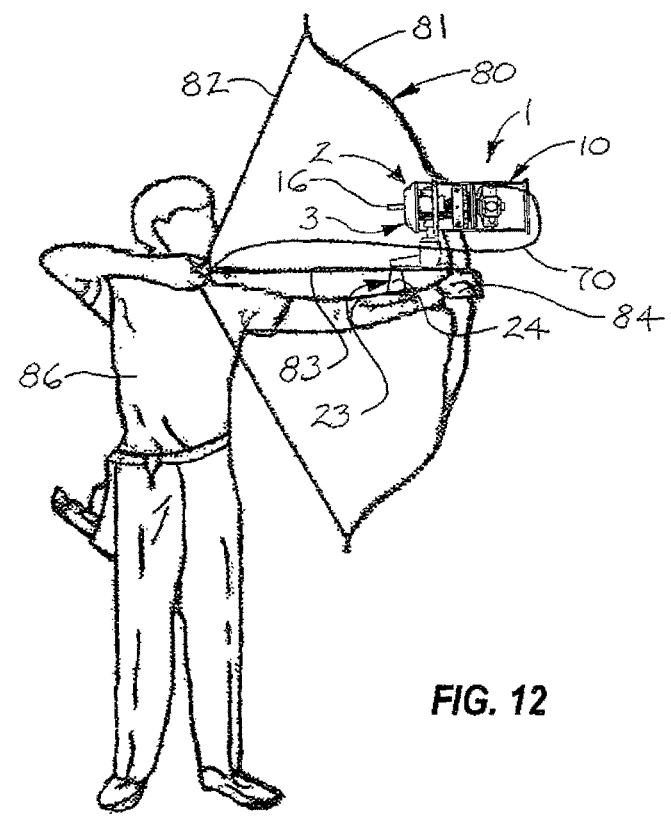
FIG. 12 is a side view of the line reel apparatus mounted on a bow in a typical bow fishing application of the line reel apparatus.

As illustrated in FIG. 12, in some applications, the line reel apparatus 1 may be mounted on a bow 80 for bow fishing. The bow 80 may have a conventional design with a flexible bow frame 81 having an arrow rest 84 and a bowstring 82 on the bow frame 81. The apparatus 1 may be mounted to the bow frame 81 typically via an apparatus mounting bracket (not illustrated) which is suitable for the purpose. In some applications, the apparatus 1 may be mounted to the bow frame 81 above the arrow rest 84, as illustrated. In other applications, the apparatus 1 may be mounted to the bow frame 81 beneath the arrow rest 84. A fishing line 70 (FIGS. 10 and 11) is wound on the spool 44 and extended through the line annulus 56 and the line opening 13 in the fishing line housing front plate 12 on the rotating housing portion 10 of the apparatus housing 2. The extending or distal end of the fishing line 70 may be tied or otherwise attached to an arrow 83 (FIG. 12) which is to be shot from the bow 80.

The hand crank 24 of the line reel apparatus 1 may initially be rotated in the reverse (typically counterclockwise) direction to facilitate orientation of the rotating housing portion 10 of the fixed housing portion 3 into the stationary housing position illustrated in FIGS. 6 and 10. Accordingly, in the stationary housing position, the pin magnet 66 on the rotating housing portion 10 may align or register with the housing retainer magnet 58 in the retainer magnet cavity 55 of the catch pin housing 52. Thus, the housing retainer magnet 58 magnetically attracts the pin magnet 66, which retains the rotating housing portion 10 in the stationary housing position. Therefore, the pin spring 62 (FIG. 10) biases and maintains the catch pin 60 in the retracted position in the catch pin cavity 53. The retracted catch pin 60 clears the line annulus 56 between the catch pin housing 52 and the rotating housing portion wall 11 of the rotating housing portion 10, enabling free 360-degree traversal of the fishing line 70 in the line annulus 56, as illustrated in FIGS. 6 and 10, as the fishing line 70 is subsequently unwound from the spool 44 through the line opening 13 in the rotating housing portion front plate 12 of the rotating housing portion 10 upon shooting of the arrow 83 from the bow 80.

As illustrated in FIG. 12, a bow shooter 86 may place the arrow 83 on the arrow rest 84 of the bow frame 81 and the bow string 82 against the rear end of the arrow 83. The bow shooter 86 may then aim the arrow 83 toward a fish in a water body (not illustrated) and draw the bow string 82. Upon subsequent release, the bow string 82 propels the arrow 83 forward from the bow 80, and the arrow 83 pulls the fishing line 70 from the rotating housing portion 10 as the fishing line 70 unwinds from the spool 44. As it unwinds from the spool 44, the fishing line 70 repeatedly and continually traverses the line annulus 56 as indicated by the counterclockwise arrow in FIG. 6.

After the arrow 83 is shot from the bow 80 and the arrow 83 either impales or misses the targeted fish, the bow shooter 86 may subsequently retrieve the arrow 83 by winding the fishing line 70 on the spool 44 upon rotation of the hand crank 24 in the forward direction. The reverse stop 32 (FIG. 5) may engage the first travel stop pin 30a such that the hand crank lock needle 34 permits continued forward rotation of the hand crank 24 until the fishing line 70 is reeled onto the spool 44. Forward rotation of the hand crank 24 facilitates like forward rotation of the rotating housing portion 10 relative to the initially stationary catch pin housing 52, as indicated by the clockwise arrow in FIGS. 6 and 7, through the handle gear 21, the bevel gear 28 and the transmission plate 74, respectively, as was heretofore described with respect to FIGS. 2-4. Accordingly, the magnetic attraction between the pin magnet 66 and the housing retainer magnet 58 is broken as the pin magnet 66 rotates with the rotating housing portion 10 away from the housing retainer magnet 58 and toward the catch pin 60 in the catch pin cavity 53 of the catch pin housing 52, which initially remains stationary. As the pin magnet 66 on the rotating housing portion 10 traverses the typically 180-degree arc from the housing retainer magnet 58 to the catch pin 60, the magnetic field breaker pin 61 which extends from the catch pin 60 may engage the retainer pin 64 which extends from the main shaft 38 to prevent rotation of the catch pin housing 52 with the rotating housing portion 10 until the pin magnet 66 is rotated into alignment or registration with the catch pin 60.

As illustrated in FIG. 8, as the rotating housing portion 10 rotates the pin magnet 66 into alignment or registration with the catch pin 60, the pin magnet 66 magnetically attracts the catch pin 60 and extends the catch pin 60 from the catch pin cavity 53 against the retaining bias imparted by the pin spring 62. Thus, as further illustrated in FIG. 8, the catch pin 60 engages the pin magnet 66 and spans the line annulus 56. Therefore, the fishing line 70 engages the catch pin 60, which prevents the fishing line 70 from counterclockwise traversal of the line annulus 56 and terminates further unwinding of the fishing line 70 from the spool 44.

As the catch pin 60 extends from the retracted position in the catch pin cavity 53 and engages the pin magnet 66, the magnetic field breaker pin 61 slides in the outward radial direction in the field breaker pin cavity 54 (FIGS. 10 and 11), disengaging the retainer pin 64. Therefore, continued forward rotation of the rotating housing portion 10 upon forward rotation of the hand crank 24 facilitates like rotation of the catch pin housing 52 with the rotating housing portion 10. Thus, the catch pin 60 pushes the fishing line 70 along the line annulus 56 in the clockwise direction, as indicated by the arrows in FIG. 9, to wind the fishing line 70 on the spool 44 and pull the arrow 83 toward the bow shooter 86. The drag wheel 40 (FIGS. 2 and 5), via the friction drag wave spring 41, may apply a drag force to the spool 44 to resist any pulling force which a fish impaled on the arrow 83 may exert on the fishing line 70 as the fishing line 70 is wound on the spool 44.

The fishing line 70 may continue to be wound on the spool 44 by forward rotation of the hand crank 24 until the arrow 83, with or without the targeted fish impaled thereon, reaches the bow shooter 86. At that point, the hand crank 24 may then be rotated in the reverse direction to facilitate corresponding reverse rotation of the rotating housing portion 10. However, the catch pin housing lock needle 48 prevents reverse rotation of the catch pin housing 52 on the main shall 38 with the rotating housing portion 10. Therefore, the rotating housing portion 10 continues to rotate and the pin magnet 66 rotates out of magnetic contact with the stationary catch pin 60, causing the pin spring 62 to again retract the catch pin 60 back into the catch pin cavity 53. When the pin magnet 66 subsequently reaches the housing retainer magnet 58, as illustrated in FIG. 6, the housing retainer magnet 58 magnetically attracts the pin magnet 66 to prevent further reverse rotation of the rotating housing portion 10 relative to the stationary catch pin housing 52 and stop the rotating housing portion 10 in the stationary housing position. At this point, the reverse stop 32 (FIGS. 2, 3 and 5) may engage the second travel stop pin 30b such that the hand crank lock needle 34 (FIG. 5) prevents further reverse rotation of the hand crank 24. The fish may be removed from the arrow 83 and the arrow 83 may be placed back into position on the arrow rest 84 and the bow string 82, and the procedure repeated.

Figure 13:
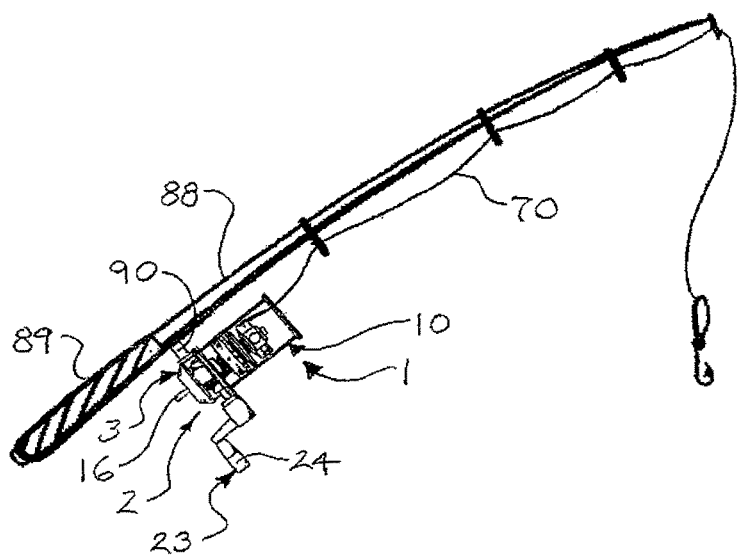
FIG. 13 is a side view of the line reel apparatus mounted on a fishing rod in a typical rod fishing application of the line reel apparatus.

As illustrated in FIG. 13, in some applications, the line reel apparatus 1 may be mounted on a fishing rod 88 for spin cast fishing. The fishing rod 88 may have a conventional design with a fishing rod handle 89. An apparatus mount bracket 90 may mount the fixed housing portion 3 of the apparatus housing 2 of the apparatus 1 to the handle 89 or other portion of the fishing rod 88 according to the knowledge of those skilled in the art.

Use of the apparatus 1 may be as was heretofore described with respect to the bow fishing application in FIG. 12. Prior to casting, the hand crank 24 may be rotated in the reverse direction to initially deploy and retain the rotating housing portion 10 in the stationary housing position illustrated in FIG. 6 by alignment of the pin magnet 66 with the housing retainer magnet 58. Thus, the pin spring 62 biases the catch pin 60 in the retracted position in the catch pin cavity 53 of the catch pin housing 52 and the catch pin 60 clears the line annulus 56, as illustrated in FIGS. 6 and 10, enabling the fishing line 70 to freely traverse the line annulus 56 as it unwinds from the spool 44 during casting.

To subsequently reel the fishing line 70 on the spool 44, the hand crank 24 may be rotated in the forward direction to facilitate initial rotation of the rotating housing portion 10 from the stationary housing position illustrated in FIG. 6 to the position illustrated in FIG. 8 such that the pin magnet 66 aligns or registers with the catch pin 60 and extends the catch pin 60 from the catch pin cavity 53 against the pin magnet 66. Thus, the catch pin 60 spans the line annulus 56 and catches the fishing line 70. Continued forward rotation of the hand crank 24 facilitates like forward rotation of the catch pin housing 52 with the rotating housing portion 10, causing the catch pin 60 to push the fishing line 70 along the line annulus 56 and wind the fishing line 70 on the spool 44. After reeling of the fishing line 70 is completed, the hand crank 24 may be rotated in the reverse direction to facilitate like reverse rotation of the rotating housing portion 10 relative to the now stationary catch pin housing 52, magnetically disengaging the pin magnet 66 from the extended catch pin 60, as illustrated in FIG. 7, such that the pin spring 62 retracts the catch pin 60 back into the catch pin cavity 53. The rotating housing portion 10 rotates the pin magnet 66 back into alignment and magnetic engagement with the housing retainer magnet 58, which retains the rotating housing portion 10 in the stationary housing position illustrated in FIG. 6. Thus, the fishing line 70 can again freely traverse the line annulus 56 and unwind from the spool 44 as another cast is made.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A line reel apparatus, comprising:
   an apparatus housing including a fixed housing portion and a rotating housing portion adjacent to the fixed housing portion;
   a pin magnet carried by the rotating housing portion;
   a drive mechanism drivingly engaging the rotating housing portion for rotation;
   a catch pin housing disposed for rotation in the rotating housing portion;
   a line annulus between the catch pin housing and the rotating housing portion;
   a catch pin cavity in the catch pin housing, the catch pin cavity disposed in aligned or registering relationship to the pin magnet along a longitudinal axis of the rotating housing portion;

a magnetic catch pin disposed in the catch pin cavity, the catch pin positional between a retracted position clearing the line annulus and an extended position spanning the line annulus upon alignment of the pin magnet with the catch pin cavity responsive to rotation of the rotating housing portion;

a bias mechanism biasing the catch pin in the retracted position in the catch pin cavity; and a spool provided in the rotating housing portion.

2. The line reel apparatus of claim 1 wherein the drive mechanism comprises a hand crank.

3. The line reel apparatus of claim 1 further comprising a handle gear drivingly engaged for rotation by the drive mechanism, a bevel gear drivingly engaged for rotation by the handle gear and a transmission plate drivingly engaged for rotation by the bevel gear and drivingly engaging the rotating housing portion for rotation on the fixed housing portion of the apparatus housing.

4. The line reel apparatus of claim 1 further comprising a friction drag wave spring engaging the spool and a drag wheel engaging the friction drag wave spring.

5. The line reel apparatus of claim 1 further comprising a housing retainer magnet carried by the catch pin housing in spaced-apart relationship to the catch pin cavity.

6. The line reel apparatus of claim 5 wherein the housing retainer magnet is about 180 degrees from the catch pin cavity.

7. The line reel apparatus of claim 1 wherein the fixed housing portion of the apparatus housing comprises a fixed housing portion front plate, a fixed housing portion rear plate spaced-apart from the fixed housing portion front plate and a fixed housing portion wall extending between the fixed housing portion front plate and the fixed housing portion rear plate.

8. The line reel apparatus of claim 7 wherein the rotating housing portion comprises a generally elongated, cylindrical rotating housing portion wall drivingly engaged for rotation by the drive mechanism, a rotating housing portion front plate carried by the rotating housing portion wall and a line opening in the rotating housing portion front plate.

9. A line reel apparatus, comprising:

an apparatus housing including a fixed housing portion and a rotating housing portion adjacent to the fixed housing portion;

a pin slot in the rotating housing portion;

a pin magnet carried by the rotating housing portion at the pin slot;

a drive mechanism drivingly engaging the rotating housing portion for rotation;

a main shaft disposed in the rotating housing portion;

a catch pin housing disposed for rotation on the main shaft;

a line annulus between the catch pin housing and the rotating housing portion;

a catch pin cavity in the catch pin housing, the catch pin cavity disposed in aligned or registering relationship to the pin slot along a longitudinal axis of the rotating housing portion;

a magnetic catch pin disposed in the catch pin cavity, the catch pin positional between a retracted position clearing the line annulus and an extended position spanning the line annulus and inserting through the pin slot upon alignment of the pin magnet with the catch pin cavity responsive to rotation of the rotating housing portion;

a bias mechanism biasing the catch pin in the retracted position in the catch pin cavity; and a spool carried by the main shaft.

10. The line reel apparatus of claim 9 wherein the drive mechanism comprises a hand crank.

11. The line reel apparatus of claim 9 further comprising a handle gear drivingly engaged for rotation by the drive mechanism, a bevel gear drivingly engaged for rotation by the handle gear and a transmission plate drivingly engaged for rotation by the bevel gear and drivingly engaging the rotating housing portion for rotation on the fixed housing portion of the apparatus housing.

12. The line reel apparatus of claim 9 further comprising a friction drag wave spring engaging the spool and a drag wheel engaging the friction drag wave spring.

13. The line reel apparatus of claim 9 further comprising a housing retainer magnet carried by the catch pin housing in spaced-apart relationship to the catch pin cavity.

14. The line reel apparatus of claim 13 wherein the housing retainer magnet is about 180 degrees from the catch pin cavity.

15. The line reel apparatus of claim 9 wherein the fixed housing portion of the apparatus housing comprises a fixed housing portion front plate, a fixed housing portion rear plate spaced-apart from the fixed housing portion front plate and a fixed housing portion wall extending between the fixed housing portion front plate and the fixed housing portion rear plate.

16. The line reel apparatus of claim 15 wherein the rotating housing portion comprises a generally elongated, cylindrical rotating housing portion wall carried by the fixed housing portion front plate of the fixed housing portion, a rotating housing portion front plate carried by the rotating housing portion wall and a line opening in the rotating housing portion front plate.

17. A line reel apparatus, comprising:

an apparatus housing including a fixed housing portion and a rotating housing portion adjacent to the fixed housing portion;

a pin slot in the rotating housing portion wall of the rotating housing portion;

a pin magnet carried by the rotating housing portion at the pin slot;

a main shaft disposed in the rotating housing portion;

a transmission plate on the main shaft, the transmission plate drivingly engaging the rotating housing portion for rotation;

a bevel gear on the main shaft and drivingly engaging the transmission plate for rotation;

a handle gear drivingly engaging the bevel gear for rotation;

a drive mechanism drivingly engaging the handle gear for rotation;

a catch pin housing disposed for rotation on the main shaft;

a line annulus between the catch pin housing and the rotating housing portion;

a catch pin cavity in the catch pin housing, the catch pin cavity disposed in aligned or registering relationship to the pin slot along a longitudinal axis of the rotating housing portion;

a magnetic catch pin disposed in the catch pin cavity, the catch pin positional between a retracted position clearing the line annulus and an extended position spanning the line annulus and inserting through the pin slot upon alignment and magnetic attraction of the pin magnet with the catch pin cavity responsive to rotation of the rotating housing portion;

a bias mechanism biasing the catch pin in the retracted position in the catch pin cavity;

a spool carried by the main shaft;

a retainer pin protruding from the main shaft; and a magnetic field breaker pin carried by the catch pin and protruding from the catch pin housing, the magnetic field breaker pin engages the retainer pin in the retracted position of the catch pin and disengages the retainer pin in the extended position of the catch pin.

18. The line reel apparatus of claim 17 wherein the drive mechanism comprises a hand crank.

19. The line reel apparatus of claim 17 wherein the fixed housing portion of the apparatus housing comprises a fixed housing portion front plate, a fixed housing portion rear plate spaced-apart from the fixed housing portion front plate and a fixed housing portion wall extending between the fixed housing portion front plate and the fixed housing portion rear plate.

20. The line reel apparatus of claim 19 wherein the rotating housing portion comprises a generally elongated, cylindrical rotating housing portion wall drivingly engaged for rotation by the transmission plate, a rotating housing portion front plate carried by the rotating housing portion wall and a line opening in the rotating housing portion front plate.

\* \* \* \* \*